(12) United States Patent
Chang et al.

(10) Patent No.: US 10,270,652 B2
(45) Date of Patent: Apr. 23, 2019

(54) NETWORK MANAGEMENT

(75) Inventors: Jichuan Chang, Sunnyvale, CA (US); Parthasarathy Ranganathan, San Jose, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 428 days.

(21) Appl. No.: 14/374,808

(22) PCT Filed: Apr. 25, 2012

(86) PCT No.: PCT/US2012/034977
§ 371 (c)(1),
(2), (4) Date: Jul. 25, 2014

(87) PCT Pub. No.: WO2013/162547
PCT Pub. Date: Oct. 31, 2013

(65) Prior Publication Data
US 2015/0074250 A1    Mar. 12, 2015

(51) Int. Cl.
*G06F 15/173* (2006.01)
*H04L 12/24* (2006.01)

(52) U.S. Cl.
CPC ........ *H04L 41/0816* (2013.01); *H04L 41/022* (2013.01); *H04L 41/0226* (2013.01); *H04L 41/06* (2013.01); *H04L 41/0654* (2013.01); *H04L 41/0659* (2013.01);
(Continued)

(58) Field of Classification Search
CPC . H04L 41/06–41/0695; H04L 12/40–12/4013; H04L 41/00; H04L 41/0226; H04L 41/04; H04L 41/046; H04L 41/0659; H04L 41/0672; H04L 41/0654–41/08; H04L 41/0803; H04L 41/0813; H04L 41/0816
See application file for complete search history.

(56) References Cited

U.S. PATENT DOCUMENTS 6,954,454 B1 * 10/2005 Schuster ................. H04L 12/56
370/352
7,480,303 B1    1/2009 Ngai
(Continued)

FOREIGN PATENT DOCUMENTS

| CN | 101277195 | 10/2008 |
|----|-----------|---------|
| CN | 101535979 B | 9/2009 |
| CN | 102164044 | 8/2011 |

OTHER PUBLICATIONS

"PCIe." Newton's Telecom Dictionary, 26th ed. Aug. 1, 2011.*
(Continued)

*Primary Examiner* — Brendan Y Higa
(74) *Attorney, Agent, or Firm* — International IP Law Group, P.C.

(57) ABSTRACT

A system and method for network management are described herein. The system includes a number of servers and a first network coupling the servers to each other and configured to connect the servers to one or more client computing devices. The system also includes a second network coupling the servers to each other, wherein data transferred between the servers is transferred though the second network. Network management requests for configuring the second network are communicated to the servers through the first network.

15 Claims, 4 Drawing Sheets

(52) U.S. Cl.
CPC ...... *H04L 41/0672* (2013.01); *H04L 41/0896* (2013.01); *H04L 41/50* (2013.01)

(56) References Cited

U.S. PATENT DOCUMENTS

| | | | | |
|---|---|---|---|---|
| 7,646,979 | B1* | 1/2010 | Ciancaglini | H04J 14/0227 398/70 |
| 7,925,802 | B2 | 4/2011 | Lauterback et al. | |
| 7,929,565 | B2 | 4/2011 | Winter | |
| 7,945,678 | B1* | 5/2011 | Skene | H04L 45/12 709/227 |
| 8,019,910 | B2 | 9/2011 | Brownell et al. | |
| 8,099,624 | B1* | 1/2012 | Saxena | G06F 11/0727 714/5.11 |
| 8,509,097 | B1* | 8/2013 | Gourlay | H04L 12/10 370/251 |
| 2002/0171886 | A1* | 11/2002 | Wu | H04L 45/02 398/20 |
| 2002/0188709 | A1* | 12/2002 | McGraw | H04L 29/06 709/223 |
| 2003/0131119 | A1* | 7/2003 | Noonan | H04L 41/00 709/232 |
| 2004/0223497 | A1* | 11/2004 | Sanderson | H04L 12/4641 370/395.52 |
| 2005/0010709 | A1* | 1/2005 | Davies | G06F 11/1456 710/305 |
| 2005/0102549 | A1* | 5/2005 | Davies | G06F 11/201 714/4.1 |
| 2008/0313240 | A1 | 12/2008 | Freking et al. | |
| 2009/0010159 | A1 | 1/2009 | Brownell et al. | |
| 2009/0016348 | A1 | 1/2009 | Norden et al. | |
| 2009/0037616 | A1 | 2/2009 | Brownell et al. | |
| 2009/0059957 | A1 | 3/2009 | Bagepalli et al. | |
| 2010/0115174 | A1 | 5/2010 | Akyol et al. | |
| 2010/0191858 | A1* | 7/2010 | Thomas | H04L 65/1069 709/231 |
| 2011/0119423 | A1 | 5/2011 | Kishore et al. | |
| 2011/0246692 | A1 | 10/2011 | Valk et al. | |
| 2013/0077481 | A1* | 3/2013 | Philavong | H04L 45/38 370/228 |
| 2015/0160627 | A1* | 6/2015 | Maddukuri | G05B 15/02 700/90 |

OTHER PUBLICATIONS

Margaret Rouse, "Blade Server" http://searchdatacenter.techtarget.com/definition/blade-server, Feb. 2008.*
PCT Search Report/Written Opinion~Application No. PCT/US2012/034977 dated Dec. 21, 2012~9 pages.

* cited by examiner

100

300

NETWORK MANAGEMENT

BACKGROUND

As data volume and processing requirements increase, computing clusters grow in size and, hence, inter-server communication requirements correspondingly increase. Traditional Ethernet and other network-based fabrics, such as InfiniBand, have full-fledged management support. However, the performance, cost, and power overheads can be significant. On the other hand, recent work on using a motherboard-level I/O-interconnect, such as PCIe, as a high-speed network fabric shows promising performance and energy efficiency results, but also reveals challenges in managing such high-speed I/O-interconnect based networks. For example, a key challenge is for such I/O-interconnects to support advanced management features such as fault tolerance, end-to-end flow control, and quality-of-service (QoS). These features are supported by traditional networks such as Ethernet, but not by I/O-interconnects such as PCIe mainly because such features are often expensive for I/O-interconnects.

BRIEF DESCRIPTION OF THE DRAWINGS

Certain examples are described in the following detailed description and in reference to the drawings, in which.

DETAILED DESCRIPTION OF SPECIFIC EXAMPLES

Techniques described herein relate generally to the management of a high-speed network that lacks management features via another lower-speed network that includes such management features. More specifically, techniques described herein relate to the combination of a high-speed I/O-interconnect, such as a Peripheral Component Interconnect Express (PCIe) network, with a separate out-of-band network, such as an Ethernet network. Such techniques may be used to simultaneously provide high-speed, energy-efficient data transfer and rich management features without significantly increasing the cost and complexity of the networking system. In various examples, the separate out-of-band network may be a low-bandwidth, low-cost network that provides reliable device discovery, registration, and other management features for a high-bandwidth I/O-interconnect that lacks such management features.

Figure 1:
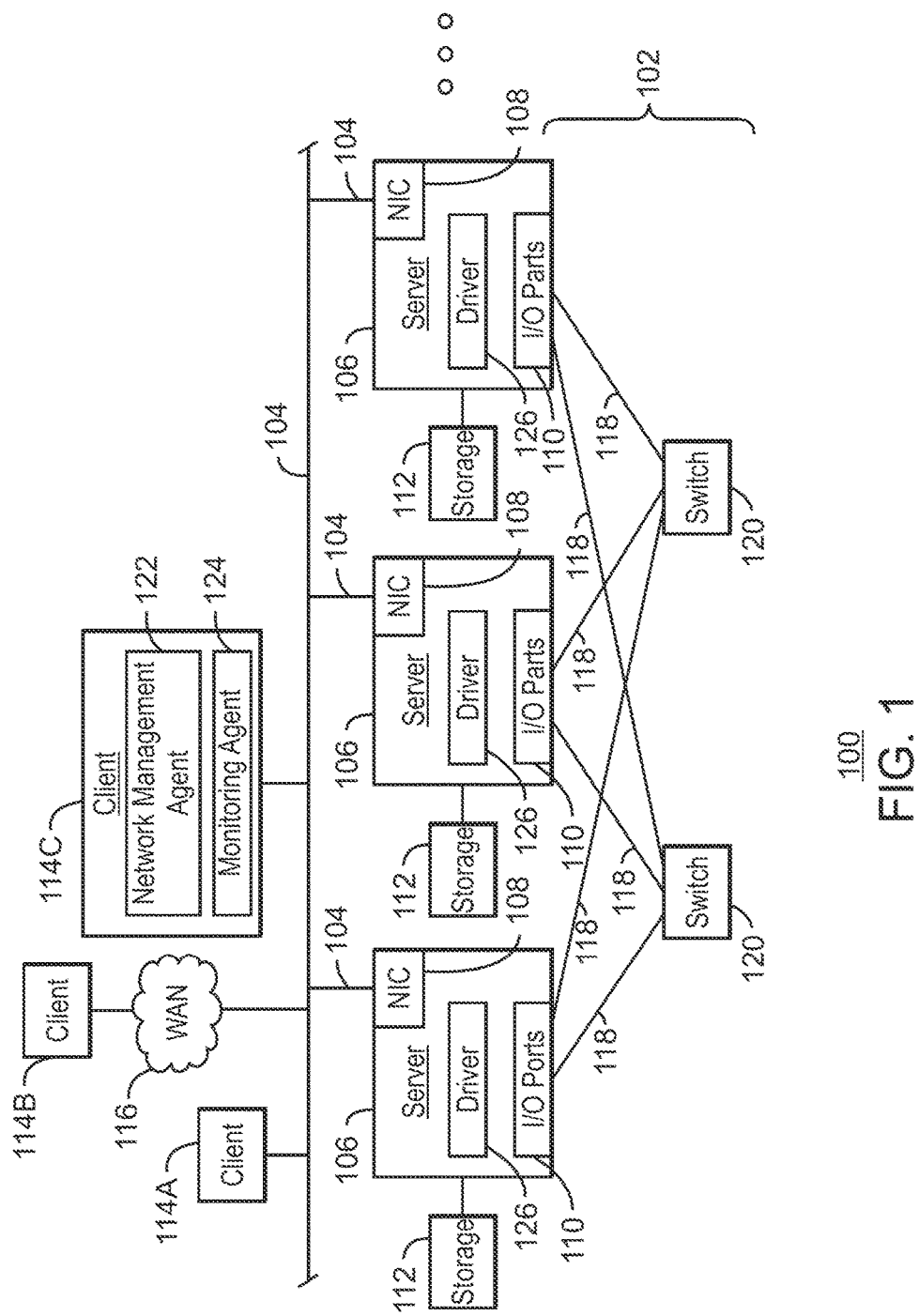
FIG. 1 is a block diagram of a networking system in accordance with examples.

FIG. 1 is a block diagram of a networking system 100 in accordance with examples. The networking system 100 may include a PCIe network 102 and an Ethernet network 104 adapted to communicably couple a number of servers 106. The servers 106 may be any of a number of different types of servers, and may be included within a cluster configuration. In various examples, each of the servers 106 may include two network interfaces, i.e., a network interface card (NIC) 108 and a number of I/O ports 110. The NIC 108 may be adapted to connect the server 106 to the Ethernet network 104, while the I/O ports 110 may be adapted to connect the server to the PCIe network 102.

Each of the servers 106 may also include a storage device 112 that is configured to store data. Such data may include data that is to be transferred between the servers 106 via the PCIe network 102, or data is to be transferred between any of the servers 106 and a client 114 via the Ethernet network 104.

The Ethernet network 104 may be used to facilitate communication between the client 114 and the servers 106. For example, data that is stored within a storage device 112 of one of the servers 106 may be sent to, or received from, the client 114 or any of the servers 106. For the sake of clarity, the present disclosure describes the network 104 as an Ethernet network. However, it will be appreciated that other types of networks may also be used in accordance with examples. For example, any type of network that provides management features may be used, such as Ethernet InfiniBand, or Fiber Channel, among others.

In various examples, the client 114 is configured to provide network administrative functions. The client 114 may be any type of computing device, such as a desktop computer, laptop computer, tablet computer, server, or mobile phone, among others. As shown in FIG. 1, one or more clients, such as the client 114A, may be communicably coupled directly to the Ethernet network 104. One or more additional clients, such as the client 114B, may be communicably coupled to the Ethernet network 104 via a wide area network (WAN) 116 such as the Internet, for example.

In various examples, the PCIe network 102 includes any suitable number of network links 118 and network switches 120 that are configured to communicably couple the servers 106 within the networking system 100. The network switches 120 may be rack-level switches. The network links 118 and network switches 120 of the PCIe network 102 may facilitate communications between the servers 106. For example, data that is stored within the storage device 112 of one of the servers 106 may be sent to, or received from, any of the other servers 106 through the PCIe network 102.

In some examples, the client 114 may request data that is distributed between more than one of the servers 106. The server 106 to which the client 114 makes the request may have access to some of the data. However, the server 106 may also have to gather additional data from any of the other servers 106. Once the additional data has been gathered, all of the requested data can be sent from the server 106 to which the client 114 made the request back to the client 114.

For the sake of clarity, the present disclosure describes the network 102 as a PCIe network. However, it will be appreciated that other types of networks may also be used. For example, the network 102 may be any type of high-speed I/O-interconnect based fabric that lacks management features, such as PCIe, HyperTransport, or other enclosure-level interconnects.

In various examples, the Ethernet network 104 is configured to manage the PCIe network 102 such that the proper operation of the PCIe network 102 is maintained. This may be accomplished via input from a network management agent 122 and/or a monitoring agent 124. As shown in FIG. 1, the network management agent 122 and the monitoring agent 124 may be included within one of the clients, such as the client 114C. In other examples, the network management agent 122 and the monitoring agent 124 reside on any of the servers 106, or on any of the network switches 120 within the PCIe network 102.

The network management agent 122 and the monitoring agent 124 may each include hardware, software, or firmware that is configured to control the configuration of the PCIe network 102 via input from the Ethernet network 104. In some examples, the network management agent 122 controls the functioning of the PCIe network 102 via network management requests that include specific actions to be performed on the PCIe network 102. Further, the monitoring agent 124 may be configured to monitor the PCIe network 102 to determine whether the actions specified by the network management requests are implemented within the PCIe network 102.

In addition, each of the servers 106 may include a driver 126 that receives management instructions from the network management agent 122 via the Ethernet network 104, for example, and translates the management instructions into actions to be performed on the PCIe network 102. The driver 126 may be configured to control the transfer of data packets over the PCIe network 102 in accordance with the specified configuration. In various examples, the driver 126 also provides a software interface for the PCIe network 102 that enables the client 114 to access the PCIe network 102 for configuration purposes. The driver 126 may be configured to provide such functionalities in either a kernel mode or a user mode, depending on the details of the specific implementation.

It is to be understood that the block diagram of FIG. 1 is not intended to indicate that the networking system 100 is to include all the components shown in FIG. 1. Further, the networking system 100 may include any suitable number of additional components not shown in FIG. 1, depending on the details of the specific implementation.

Figure 2:
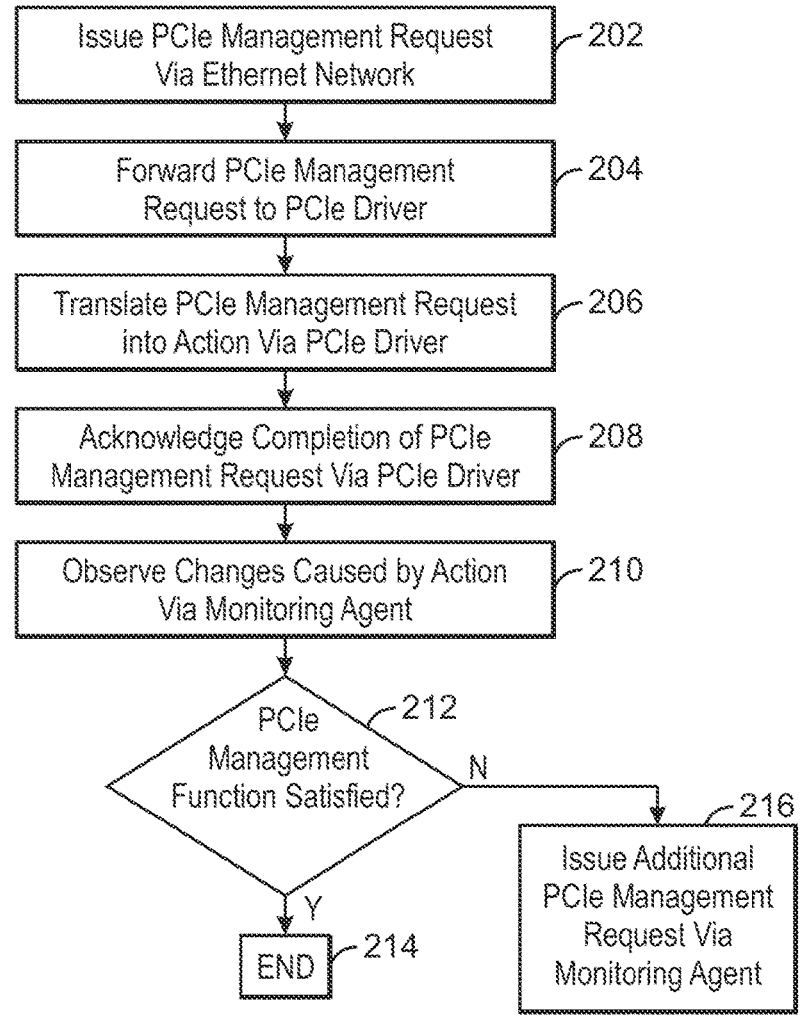
FIG. 2 is a process flow diagram showing a method for managing a PCIe network via an Ethernet network.

FIG. 2 is a process flow diagram showing a method 200 for managing a PCIe network via an Ethernet network. In various examples, the method 200 may be implemented within the networking system 100 discussed above with respect to FIG. 1.

The method begins at block 202, at which a PCIe management request is issued via the Ethernet network. The PCIe management request may be issued by the network management agent 122 that resides on the client 114, or on any of the servers 106, as discussed above with respect to FIG. 1. The PCIe management request may be any type of request that relates to managing the PCIe network. For example, the PCIe management request may relate to configuring, controlling, coordinating, or monitoring the servers and other network devices within the PCIe network. In addition, such a PCIe management request may provide security management, performance management, fault management, configuration management, and bandwidth management for the PCIe network.

In some examples, the PCIe management request is sent by the network management agent automatically. For example, if a server is disconnected from the PCIe network, the network management agent may send a PCIe management request automatically after the server is rebooted. In other examples, the network management agent may issue a PCIe management request in response to input from a user, such as a network administrator, via a client computing device.

In some examples, the PCIe management request is a request to include a rebooted server in the PCIe network. Such a PCIe management request may provide fault tolerance, as well as server fault isolation, for the PCIe network. For example, if one server fails, and the PCIe network's connection to the server is lost, the Ethernet network may allow for the rediscovery and registration of the server using the PCIe management request. The network management agent may automatically send such a PCIe management request in response to the failure of a particular server.

In other examples, the PCIe management request is a request to change a data flow rate between servers. Such a PCIe management request may be used to provide out-of-band flow control and quality of service (QoS) information from the Ethernet network to the PCIe network. In response to a PCIe management request related to a change in data flow rate, the driver may adjust the data flow rate between servers using any suitable means. For example, the driver may adjust the data buffer size or data packet priorities for different flows between the servers based on the PCIe management request.

Further, in some examples, the PCIe management request is a device discovery request. The device discovery request may instruct the driver 126 to identify devices connected to the PCIe network, such as switches, servers, and the like. Devices discovered by the driver 126 may be reported back to the network management agent through the Ethernet network.

At block 204, the network management agent forwards the PCIe management request to a PCIe driver. In various examples, the PCIe management request is forwarded to the PCIe driver within any number of specific servers relating to the PCIe management request. In examples, the Ethernet packet used to communicate the PCIe management request may include header information that identifies it as a PCI management request. The header information may also identify one or more target servers for the PCIe management request.

At block 206, the PCIe management request is translated into an action via the PCIe driver. The action relates to a specific PCIe management function. For example, the action may include configuring the PCIe switch topology and bandwidth, or controlling the transfer rate of data packets for specific flows. The action may also include changing the width, voltage, or frequency of PCIe links, or diagnosing related functions, among others. In some examples, the PCIe driver translates the PCIe management request into a number of actions relating to the specific PCIe management function.

At block 208, upon completion of the PCIe management request, the PCIe driver sends an acknowledgement to the source of the PCIe management request through the Ethernet network. At block 210, changes to the PCIe network that were caused by the action relating to the PCIe management request are observed via the monitoring agent. Such changes may include both device-level and user-level changes to the PCIe network.

At block 212, the monitoring agent makes a determination regarding whether the PCIe management request has been satisfied. If it is determined that the PCIe management function has been satisfied, the method 200 is completed at block 214. In some examples, the monitoring agent issues a confirmation message through the Ethernet to indicate that the PCIe management function has been satisfied. However, if it is determined that the PCIe management function has not been satisfied, an additional PCIe management request may be issued via the monitoring agent at block 216. This may be repeated until the PCIe management function that was specified by the original PCIe management request has been satisfied.

FIG. 2 is not intended to indicate that blocks 202-216 are to be executed in any particular order. In addition, any of the blocks 202-216 may be deleted, and any number of additional processes may be added to the method 200, depending on the details of the specific implementation.

Figure 3:
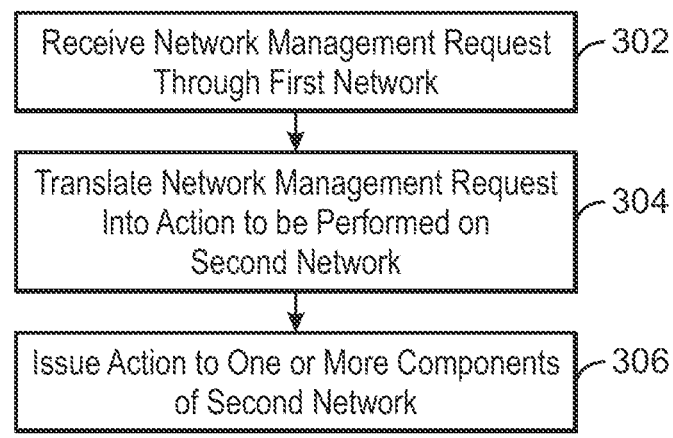
FIG. 3 is a process flow diagram showing a method for network management.

FIG. 3 is a process flow diagram showing a method 300 for network management. In various examples, the method 300 is implemented within the networking system 100 discussed above with respect to FIG. 1. For example, the method 300 may be performed by the driver 126 that resides within each of the servers 106. Further, in some examples, the first network is an I/O-interconnect network, such as a PCIe network, and the second network is an Ethernet network, as discussed above with respect to FIG. 2.

The method begins at block 302, at which a network management request is received at the driver through the first network. The network management request may be any type of request that relates to managing the configuration of the second network.

At block 304, the driver translates the network management request into an action to be performed on the second network. The action may be, for example, a change to the size of a data buffer on one of the servers, or a change to the priority of data packets sent between servers. In addition, if the network management request is a request to include a rebooted server in the second network, the action may be a notification to a switch of the second network to include the rebooted server. Further, in some examples, the network management request is translated into multiple actions.

At block 306, the driver issues the action to one or more components of the second network. The components of the first network may be configured to perform the specified action. The action may result in the implementation of a management function corresponding to the network management request. For example, the action may change a transfer rate of data exchanged between servers on the second network, or may instruct a switch of the second network to include a rebooted server on the second network. Further, in some examples, if the network management request includes multiple actions, all of the actions may be used to implement a specific management function.

FIG. 3 is not intended to indicate that blocks 302-306 are to be executed in any particular order. In addition, any of the blocks 302-306 may be deleted, or any number of additional processes may be added to the method 300, depending on the details of the specific implementation. For example, the method 300 may include monitoring the second network via a monitoring agent to determine whether the action that issued to the one or more components of the second network resulted in the successful implementation of a management function corresponding to the network management request. The monitoring agent may issue a confirmation through the first network if the action resulted in the successful implementation of the management function. In various examples, the monitoring agent automatically issues an additional network management request if the action did not result in the successful implementation of the management function.

Figure 4:
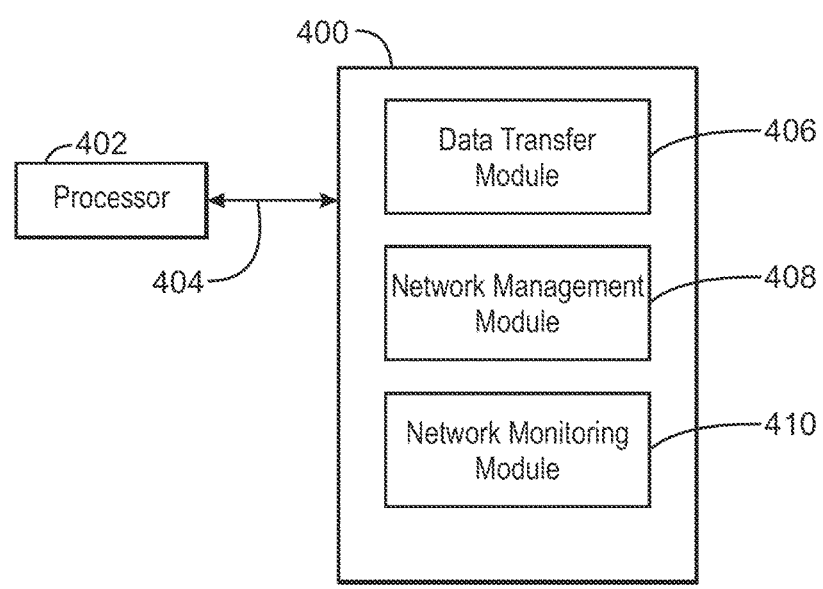
FIG. 4 is a block diagram showing a tangible, non-transitory computer-readable medium that stores a protocol adapted to manage a PCIe network via an Ethernet network.

FIG. 4 is a block diagram showing a tangible, non-transitory computer-readable medium 400 that stores code configured to manage a PCIe network via an Ethernet network. The tangible, non-transitory computer-readable medium 400 may be accessed by a processor 402 over a computer bus 404. Furthermore, the tangible, non-transitory computer-readable medium 400 may include code to direct the processor 402 to perform the steps of the current method.

The various software components discussed herein may be stored on the tangible, non-transitory computer-readable medium, as indicated in FIG. 4. For example, a data transfer module 406 may be configured to transfer data between a number of servers via the PCIe network or the Ethernet network. A network management module 408 may be configured to monitor and manage the PCIe network via the Ethernet network to ensure that the PCIe network is functioning properly. Such a management procedure may be performed using a number of network management requests that include specific actions relating to management functions to be performed. In addition, a network monitoring module 410 may be configured to monitor the PCIe network to determine whether the management functions specified by the network management requests have been implemented within the PCIe network.

The block diagram of FIG. 4 is not intended to indicate that the tangible, non-transitory computer-readable medium 400 is to include all of the components shown in FIG. 4. Further, any number of additional components may be included within the tangible, non-transitory computer-readable medium 400, depending on the details of the specific implementation.

While the present techniques may be susceptible to various modifications and alternative forms, the examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A system comprising:
a plurality of servers;
a first network coupling the plurality of servers to each other and configured to connect the plurality of servers to one or more client computing devices;
a second network coupling the plurality of servers to each other, wherein data transferred between the plurality of servers is transferred through the second network; and
at least a first server, among the plurality of servers, configured to receive network management requests for configuring the second network from the one or more client computing devices through the first network, the network management requests comprising a request to update a configuration of the second network.

2. The system of claim 1, wherein the first network is an Ethernet network and the second network is a PCIe network.

3. The system of claim 1, wherein each of the plurality of servers comprises a driver configured to receive the network management requests, translate the network management requests into actions to be performed on the second network, and issue the actions to one or more components of the second network.

4. The system of claim 1, comprising a network management agent coupled to the first network and configured to issue the network management requests.

5. The system of claim 1, wherein a network management request comprises a data-flow control request to be implemented on the second network.

6. The system of claim 1, comprising a network monitoring agent configured to monitor the first network and the second network and issue network management requests.

7. The system of claim 1, further comprising:
a monitoring agent, at one or more of the plurality of servers, that determines whether the update to the configuration of the second network has been completed and reports a result of the determination to the one or more client computing devices through the first network.

8. The system of claim 1, further comprising:
a monitoring agent, at the one or more client devices, that determines that the update to the configuration of the second network has not been completed and causes a second request to update the configuration of the second network to be transmitted via the first network.

9. The system of claim 1, wherein the request to update the configuration of the second network comprises information that indicates that the request is to occur on the second network.

10. The system of claim 9, wherein the first network comprises an Ethernet network, the network management requests are transmitted via Ethernet data packets, and the information that indicates that the request is to occur on the second network is encoded into a header of an Ethernet data packet.

11. The system of claim 1, wherein the request to update the configuration of the second network comprises a request to change a configuration setting that specifies a data buffer size or data packet priority between the plurality of servers over the second network.

12. The system of claim 1, wherein the request to update the configuration of the second network comprises a request to provide fault tolerance and server fault isolation.

13. A system comprising:
   a plurality of servers;
   a first network coupling the plurality of servers to each other and configured to connect the plurality of servers to one or more client computing devices; and
   a second network coupling the plurality of servers to each other, wherein data transferred between the plurality of servers is transferred though the second network;
   wherein network management requests for configuring the second network are communicated to the plurality of servers through the first network, wherein a network management request comprises a request to notify a switch of the second network to include a rebooted server as part of the second network.

14. A tangible, non-transitory, computer-readable medium that stores computer-readable instructions that direct a processor to:
   receive a network management request comprising a request to update a configuration of a second network for configuring the second network from one or more client computing devices through a first network, and determine that the network management request is directed to the second network and comprises a request to update a configuration of the second network, wherein the first network coupling the plurality of servers to each other and configured to connect the plurality of servers to the one or more client computing devices, and wherein the second network coupling the plurality of servers to each other, wherein data transferred between the plurality of servers is transferred through the second network;
   translate the network management request into an action to be performed on the second network; and
   issue the action to one or more components of the second network.

15. The tangible, non-transitory computer-readable medium of claim 14, wherein the action changes a configuration setting that specifies a data buffer size or data packet priority between the plurality of servers via the second network.

* * * * *